United States Patent [19]
Fujita

[11] Patent Number: 5,822,709
[45] Date of Patent: Oct. 13, 1998

[54] VEHICLE ATTITUDE CONTROL SYSTEM HAVING VEHICLE DECELERATING DEVICE OPERATED BEFORE OPERATION OF VEHICLE ATTITUDE CONTROL DEVICE

[75] Inventor: Kozo Fujita, Aichi-Ken, Japan

[73] Assignee: Toyota Jidosha Kabushiki Kaisha, Toyota, Japan

[21] Appl. No.: 628,224

[22] Filed: Apr. 4, 1996

[30] Foreign Application Priority Data

Jun. 4, 1995 [JP] Japan ................................ 7-081530

[51] Int. Cl.⁶ .............................. B60T 8/58; B60K 28/16
[52] U.S. Cl. .............................. 701/70; 701/38; 701/72; 701/91; 180/197
[58] Field of Search .................... 701/70, 71, 72, 701/74, 78, 79, 82, 83, 84, 85, 91, 37, 38; 180/197; 303/140, 146

[56] References Cited

U.S. PATENT DOCUMENTS

| | | | |
|---|---|---|---|
| 4,947,954 | 8/1990 | Fujita et al. | 180/197 |
| 4,955,448 | 9/1990 | Ise et al. | 303/141 |
| 4,971,164 | 11/1990 | Fujita et al. | 701/83 |
| 4,998,593 | 3/1991 | Karnopp et al. | 701/41 |
| 5,328,255 | 7/1994 | Isella | 303/140 |
| 5,446,657 | 8/1995 | Ikeda et al. | 701/41 |
| 5,508,929 | 4/1996 | Harada | 280/707 |

FOREIGN PATENT DOCUMENTS

| | | |
|---|---|---|
| A-555860 | 8/1993 | European Pat. Off. . |
| A-4404098 | 9/1994 | Germany . |
| A-4446897 | 6/1995 | Germany . |
| 345453A | 2/1991 | Japan . |
| A-2257761 | 1/1993 | United Kingdom . |
| A-9104891 | 4/1991 | WIPO . |

OTHER PUBLICATIONS

Instruction Manual for Toyota Crown Majesta, Aug. 1995, pp. 2-55 through 2-66.

*Primary Examiner*—Tan Q. Nguyen
*Attorney, Agent, or Firm*—Kenyon & Kenyon

[57] ABSTRACT

A vehicle attitude control system for controlling an attitude of a motor vehicle, which system is provided with an attitude control device including a vehicle condition sensor for detecting at least one physical value relating to a turning condition of the vehicle, an attitude control mechanism for controlling the attitude of the vehicle, and a controller for controlling the attitude control mechanism so as to control the attitude of the vehicle on the basis of an output of the vehicle condition sensor, and wherein a deceleration control device is provided to decelerate the motor vehicle before the attitude control by the attitude control device is initiated, so that the attitude control device provides an intended effect of eliminating a drift-out or spinning tendency of the vehicle during turning, by operation of the attitude control device after initiation of the deceleration control.

20 Claims, 8 Drawing Sheets

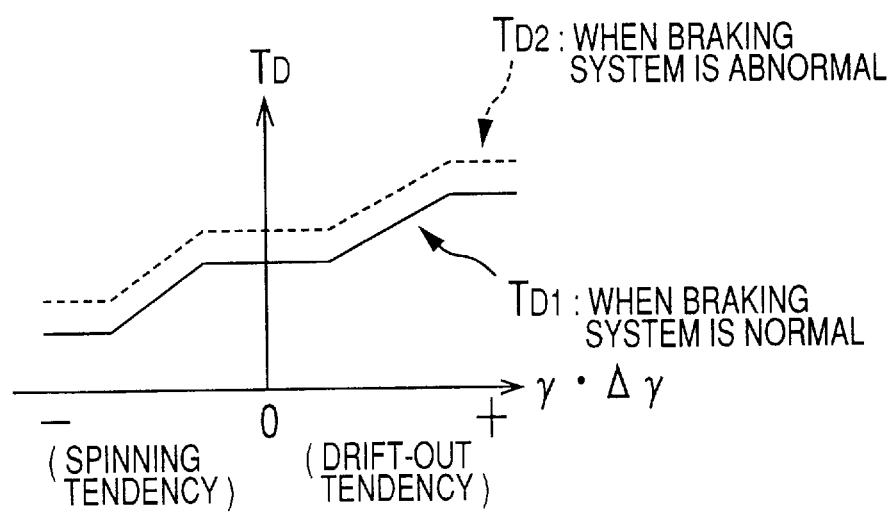
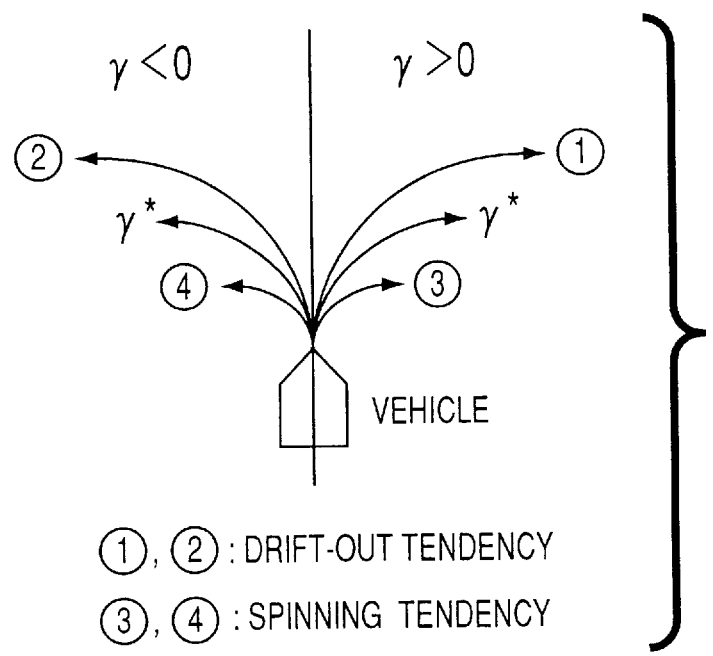

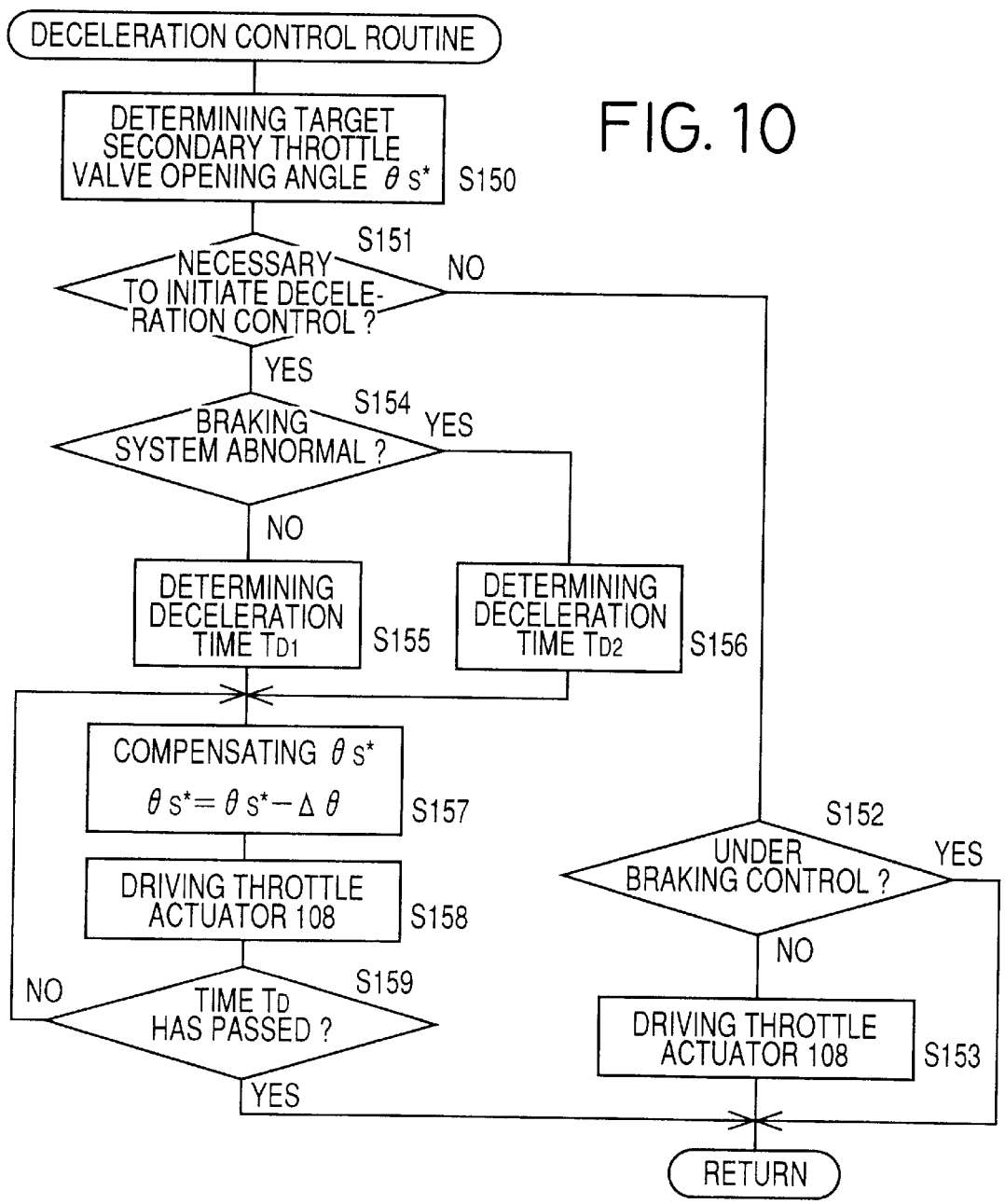

VEHICLE ATTITUDE CONTROL SYSTEM HAVING VEHICLE DECELERATING DEVICE OPERATED BEFORE OPERATION OF VEHICLE ATTITUDE CONTROL DEVICE

BACKGROUND OF THE INVENTION

1. Field of the Invention

The present invention relates in general to a vehicle attitude control system including an attitude control device for controlling the attitude of a motor vehicle during turning thereof, and more particularly to techniques for improving an effect provided by the attitude control device.

2. Discussion of the Related Art

Such a motor vehicle attitude control system is generally provided with an attitude control device including (a) a vehicle condition sensor for detecting at least one physical value relating to the turning condition of the vehicle, (b) an attitude control mechanism for controlling the attitude of the vehicle, and (c) a controller for controlling the attitude control mechanism so as to control the vehicle attitude on the basis of an output of the vehicle condition sensor.

An example of a known vehicle attitude control system of the type explained above is disclosed in JP-A-3-45453. This vehicle attitude control system is adapted to reduce a "drift-out" tendency or "spinning" tendency of the vehicle during turning or corning thereof, by giving the vehicle a suitable yaw moment by controlling a difference between braking forces applied to a right and a left wheel of the vehicle. The "drift-out" tendency is a tendency of the vehicle (more precisely, its front wheels) to go outward away from the direction of a turn, while the "spinning" tendency is a tendency of the vehicle (more precisely, its front wheels) to go inward away from the direction of the turn.

In the known vehicle attitude control system, the attitude control device initiates an operation to control the yaw moment of the vehicle, immediately after this control operation is found necessary. In some conditions where the vehicle is running at a relatively high speed, the operation of the attitude control device initiated at such early point of time will not achieve an intended effect to control the yaw moment, since a comparatively large centrifugal force is acting on the turning vehicle, for example.

In an effort to enable the attitude control device to achieve the intended effect, the present inventor has found it desirable to first decelerate the vehicle to a suitable extent and then initiate the operation of the attitude control device after reduction of the running speed of the vehicle, rather than to initiate the operation of the attitude control device immediately after the operation is found necessary.

SUMMARY OF THE INVENTION

It is therefore an object of the present invention to provide a vehicle attitude control system which permits the attitude control device to achieve an intended effect for controlling the attitude of a motor vehicle even when the vehicle is running at a high speed.

The above object may be achieved according to the principle of the present invention, which provides a vehicle attitude control system for controlling an attitude of a motor vehicle, the system comprising: an attitude control device including a vehicle condition sensor for detecting at least one physical value relating to a turning condition of the vehicle, an attitude control mechanism for controlling the attitude of the vehicle, and a controller for controlling the attitude control mechanism for effecting an attitude control so as to control the attitude of the vehicle on the basis of an output of said vehicle condition sensor; and a deceleration control device for effecting a deceleration control to decelerate said motor vehicle before said attitude control by said attitude control device is initiated.

The vehicle condition sensor may be adapted to detect at least one physical value selected from among physical quantities reflecting an intention of the vehicle operator, such as the steering angle of the front wheels of the vehicle, the angle of rotation of the steering wheel by the vehicle operator, and the running speed of the vehicle, for example, or alternatively, physical quantities representing the turning condition of the vehicle, such as the actual yaw rate and lateral deceleration of the vehicle, for example. It is noted that the front wheel steering angle, steering wheel angle and running speed of the vehicle are considered to be associated with the inputs from the vehicle operator to the vehicle, while the actual yaw rate and lateral acceleration of the vehicle are considered to be associated with the outputs from the vehicle.

The attitude control mechanism may be a mechanism for controlling a difference between driving forces applied to the right and left wheels of the vehicle, and/or a difference between braking forces applied to the right and left wheels, so as to give the vehicle a yaw moment suitable for controlling the attitude of the vehicle. Alternatively, the attitude control mechanism may be a mechanism for controlling the steering angle of the rear wheels to thereby control cornering forces acting on the rear wheels so as to give the vehicle the suitable yaw moment. The attitude control mechanism may also be a mechanism for controlling the roll stiffness distribution of the front and rear suspension systems of the vehicle.

The deceleration control device may be adapted to control the rotating torque of the wheels, that is, at least one of the driving and braking torques of the wheels so as to decelerate the vehicle. However, the deceleration control device may be otherwise adapted to decelerate the vehicle, for example, by using a pneumatically operated brake.

The device for controlling the "rotating torque" of the wheels may be adapted to reduce the driving torques of both of the right and left driving wheels of the vehicle simultaneously during driving of the vehicle with the driving torques being applied to the driving wheels. Alternatively, the device may be adapted to increase the braking torques of both of the right and left wheels (front right and left wheels, and/or rear right and left wheels) simultaneously during braking of the vehicle, or generate braking torques to be applied to the right and left wheels (front right and left wheels, and/or rear right and left wheels) during normal running of the vehicle without braking. For instance, the driving torques of the right and left wheels may be reduced by reducing the output torque of the vehicle engine, or the output torque of the transmission. The braking torques may be increased or generated by wheel brakes operated by a pressurized fluid or an electromagnetic force.

In the vehicle attitude control system of the present invention constructed as described above, the deceleration control device is operated to effect the deceleration control for decelerating the vehicle before the attitude control by the attitude control device is initiated. Accordingly, the attitude control of the vehicle by the attitude control device is initiated after the vehicle speed is lowered to a certain level lower than the vehicle speed at which the attitude control is conventionally effected without prior deceleration of the vehicle. As a result, the attitude control device provides an intended effect of controlling the vehicle attitude so as to eliminate an undesirable running or turning tendency of the vehicle such as a drift-out or spinning tendency.

The attitude control device and the deceleration control device may use the same mechanism. In this case, however, the load on this mechanism tends to be undesirably large.

The above undesirability may be removed according to a first preferred form of this invention, wherein the deceleration control device comprises a decelerating mechanism for decelerating the vehicle, which mechanism is different from the attitude control mechanism. Since the attitude control device and the deceleration control device use different mechanisms, the load on each of these two different mechanisms is significantly reduced as compared with that of the mechanism commonly used by the two devices. Accordingly, the operating reliability of the deceleration control device and the attitude control device is improved.

The deceleration control device provided according to the principle of this invention is usually adapted to reduce the rotating torque of each of at least one torque-controlled wheel selected from a plurality of wheels of the vehicle. In this case, the amount of reduction of the rotating speed of the torque-controlled wheel may be held constant. However, the reduction of the rotating speed of the torque-controlled wheel by the deceleration control results in an increase in the slip ratio of this torque-controlled wheel in the longitudinal direction of the vehicle, which tends to cause a decrease in the lateral force generated between the torque-controlled wheel and the road surface on which the vehicle is running. The value of the lateral force that should be generated for the same torque-controlled wheel to eliminate a drift-out tendency of the vehicle differs from the lateral force that should be generated for that wheel to eliminate a spinning tendency of the vehicle. Where the vehicle has front wheels and rear wheels and the rear wheels are selected as the torque-controlled wheels whose rotating torques are controlled by the deceleration control device, it is desirable or adequate to reduce the lateral forces of the rear wheels (torque-controlled wheels) for eliminating the drift-out tendency of the vehicle, while it is desirable or adequate to increase the lateral forces of the rear wheels for eliminating the spinning tendency of the vehicle. In view of this fact, it is preferable to adapt the deceleration control device to change the amount of reduction of the rotating speed of each torque-controlled wheel depending upon whether the vehicle has the drift-out tendency or the spinning tendency, so that the deceleration control effected before initiation of the attitude control permits the attitude control to be sufficiently effective to eliminate the drift-out or spinning tendency.

In the light of the above, there is provided a vehicle attitude control system according to a second preferred form of the present invention, wherein the motor vehicle has a plurality of wheels including at least one torque-controlled wheel, and the deceleration control device is adapted to reduce a rotating torque of each torque-controlled wheel, and comprises a wheel deceleration amount controlling portion for controlling an amount of reduction of a rotating speed of each torque-controlled wheel by the deceleration control device such that the amount of reduction of the rotating speed is smaller where it is adequate to increase a lateral force which is generated between each torque-controlled wheel and a road surface during the attitude control initiated after initiation of the deceleration control, than where it is not adequate to increase the lateral force.

In the vehicle attitude control system according to the second preferred form of the invention, the wheel deceleration amount controlling portion is arranged such that the amount of reduction of the rotating speed of the torque-controlled wheel is relatively small where it is adequate or desirable to increase the lateral force between the wheel and the road surface during the following attitude control, and is relatively large where it is adequate or desirable to increase the lateral force. In this system, the deceleration control device is not simply adapted to decelerate the vehicle, but is adapted to partly achieve the function of controlling the yaw moment of the vehicle, which function is primarily achieved by the attitude control by the attitude control device which is initiated following the initiation of the deceleration control. In this form of the vehicle attitude control system, therefore, the amount of reduction of the rotating speed of each torque-controlled wheel is optimized in relation to the lateral force that should be generated for the wheel during operation of the attitude control device. Accordingly, the load on the attitude control device which is operated after the initiation of the deceleration control is reduced in the present form of the invention, as compared with that where the amount of reduction of the speed of the torque-controlled wheel is held constant irrespective of the value of the lateral force that should be generated during the attitude control.

The amount of reduction of the vehicle running speed by the deceleration control device may be held constant irrespective of the expected effect of the following attitude control to control the vehicle attitude. However, this arrangement does not assure that the attitude control device provides the intended effect of controlling or stabilizing the vehicle attitude. In this respect, it is preferable to increase the amount of reduction of the vehicle speed by the deceleration control, if the intended effect of the following attitude control is not expected. In other words, it is preferable to change the amount of reduction of the vehicle speed by the deceleration control device, depending upon whether the intended effect of the attitude control is expected or not.

In view of the above, there is provided a vehicle attitude control system according to a third preferred form of this invention, wherein the deceleration control device comprises a vehicle deceleration amount controlling portion for controlling an amount of reduction of a running speed of the vehicle by the deceleration control device such that the amount of reduction of the running speed is larger where the attitude control initiated after initiation of the deceleration control is not expected to provide an intended effect of controlling the attitude of the vehicle, than where the attitude control is expected to provide the intended effect.

In the vehicle attitude control system according to the third preferred form of the present invention, the vehicle deceleration amount controlling portion is arranged such that the amount of reduction of the vehicle speed by the deceleration control device is relatively large where the intended effect of the attitude control device is not expected, and is relatively small where the intended effect is expected. Thus, the deceleration control device partly achieves the function of the attitude control device, if the attitude control device operated after initiation of the deceleration control does not appear to achieve the intended function. Accordingly, the amount of reduction of the vehicle speed by the deceleration control is optimized in relation to the expected effect to be achieved by the attitude control initiated after initiation of the deceleration control. In other words, the deceleration control device is operated so as to supplement the attitude control device. Therefore, the load of the attitude control device is reduced in the present form of the invention, as compared with that where the amount of reduction of the vehicle speed by the deceleration control device is held constant irrespective of the expected effect to be achieved by the attitude control device which is operated after initiation of the deceleration control.

According to a fourth preferred form of this invention, the vehicle condition sensor comprises a sensor for detecting a running speed of the motor vehicle, and a sensor for detecting an angle of rotation of a steering wheel of the vehicle, and the controller controls the attitude control mechanism on the basis of the running speed and the angle of rotation of the steering wheel.

In one advantageous arrangement of the above fourth preferred form of the invention, the attitude control mechanism may include a rear steering actuator which includes an electric motor or a pressure source as a drive source and which is adapted to control a steering angle of the rear wheels of the vehicle. In this case, the controller controls the rear steering actuator on the basis of the detected running speed of the vehicle and the detected angle of rotation of the steering wheel.

In the above advantageous arrangement of the fourth preferred form of the invention, a target yaw rate or lateral acceleration of the vehicle may be first obtained on the basis of the detected vehicle speed and rotation angle of the steering wheel, so that the steering angle of the rear wheels is controlled by the rear steering actuator under the control of the controller on the basis of the target yaw rate or lateral acceleration.

According to a fifth preferred form of the invention, the vehicle condition sensor comprises a sensor for detecting one of a lateral acceleration and a yaw rate of the vehicle, and the controller controls the attitude control mechanism on the basis of the one of the lateral acceleration and yaw rate of the vehicle.

In one advantageous arrangement of the the above fifth preferred form of the invention, too, the attitude control mechanism includes the rear steering actuator described above, and the controller controls the rear steering actuator on the basis of the detected yaw rate or lateral acceleration of the vehicle.

In the above advantageous arrangement of the fifth preferred form of the invention, the steering angle of the rear wheels may be controlled such that the detected yaw rate or lateral acceleration is fed back to the controller so that the detected yaw rate or lateral acceleration coincides with a target value.

According to a sixth preferred form of the present invention, the attitude control mechanism comprises a brake actuator capable of braking right and left wheels of the vehicle independently of each other, and the controller controls the brake actuator so as to generate a difference between braking forces to be applied to the right and left wheels, for thereby controlling a yaw moment of the vehicle to thereby effect the attitude control to control the attitude of the vehicle.

According to a seventh preferred form of this invention, the controller comprises first determining means for determining whether a predetermined first condition of the vehicle for initiating the attitude control by the attitude control device is satisfied, and second determining means for determining whether a predetermined second condition of the vehicle for initiating the deceleration control by the deceleration control device is satisfied. In this form of the vehicle attitude control system, the first and second conditions of the vehicle are determined such that the second condition is more likely to be satisfied than the first condition, and the controller is adapted to generate a deceleration command to initiate the deceleration control when the predetermined second condition is satisfied.

The first and second conditions of the vehicle may be represented by a suitable parameter or parameters such as a lateral slip angle of the vehicle body, a rate of change of the lateral slip angle, and a yaw rate and a lateral acceleration of the vehicle.

In one advantageous arrangement of the above seventh preferred form of the invention, the first determining means determines that the predetermined first condition of the vehicle is satisfied when the following formula is satisfied:

$$|\beta/a_2+\beta'/b_2|\geq 1$$

wherein, $\beta$ represents a lateral slip angle of a body of the vehicle while $\beta'$ represents a rate of change of the lateral slip angle, and $a_1$ and $b_1$ are positive integers, and the second determining means determines that the predetermined second condition of the vehicle is satisfied when the following formula is satisfied:

$$|\beta/a_2+\beta'/b_2|\geq 1$$

wherein, $a_2$ and $b_2$ are positive integers which are smaller than $a_1$ and $b_1$, respectively.

In another advantageous arrangement of the seventh preferred form of the invention, the deceleration control device is held operated to continue the deceleration control while the deceleration command is generated from the controller.

In a further advantageous arrangement of the seventh preferred form of the invention, the controller inhibits the first determining means from operating to determine whether the predetermined first condition of the vehicle is satisfied, until a predetermined deceleration time has passed after the deceleration control is initiated upon determination by the second determining means that the predetermined second condition of the vehicle is satisfied. In this arrangement, the controller inhibits the attitude control device from initiating the attitude control until the deceleration time has passed.

In a still further advantageous arrangement of the seventh preferred form of the invention, the first determining means and the second determining means are operated in parallel with each other, in other words, the first determining means is operated independently of the second determining means, and the controller permits the attitude control device to operate even during the deceleration control, if the first determining means determines that the predetermined first condition of the vehicle is satisfied, after initiation of the deceleration control by the deceleration control device.

However, the controller may be adapted to determine, on the basis of the output of the vehicle condition sensor, whether the deceleration control should be initiated or not, and command the deceleration control device to initiate the deceleration control when the controller determines that the deceleration control should be initiated. In this case, the attitude control is automatically initiated when the deceleration control is terminated.

According to an eighth preferred form of this invention, the deceleration control device comprises an engine torque control mechanism for controlling an output torque of an engine of the vehicle so as to decelerate the vehicle.

In one advantageous arrangement of the above eighth preferred form of the invention, the engine torque control mechanism comprises a throttle valve disposed in a suction passage of the engine, and a throttle actuator for reducing an opening angle of the throttle valve to thereby reduce the output torque of the engine. In this case, the engine may include a main throttle valve disposed in the suction passage and operated mechanically or electrically according to an operation by the vehicle operator to accelerate the vehicle, and a secondary throttle valve which is electrically operated by the throttle actuator and which is disposed in series with the main throttle valve. In this instance, the secondary throttle valve functions as the throttle valve whose opening angle is reduced by the throttle actuator.

In the above advantageous arrangement, the deceleration control device may be adapted to decrement the angle of opening of the secondary throttle valve by a predetermined decrement amount, while a deceleration command generated from the controller is present.

The engine torque control mechanism may comprise a mechanism for retarding an ignition timing of the engine to thereby reduce the output torque of the engine. Alternatively, the engine torque control mechanism may comprise a mechanism for reducing or zeroing an amount of a fuel to be injected into the engine, to thereby reduce the output torque of the engine.

According to a ninth preferred form of this invention, the vehicle attitude control system is installed on a rear-drive 4-wheel vehicle having a front right and a front left wheel which are non-driving wheels, and a rear right and a rear left wheel which are driving wheels. In this form of the invention, the deceleration control device reduces an output torque of an engine of the vehicle to reduce rotating speeds of the rear right and left wheels for thereby decelerating the vehicle, and the controller comprises first determining means for determining, on the basis of the output of the vehicle condition sensor, whether the vehicle has a drift-out tendency or a spinning tendency, and second determining means for determining a deceleration time during which the vehicle is continuously decelerated by the deceleration control device, such that the deceleration time is longer when the vehicle has the drift-out tendency than when the vehicle has the spinning tendency.

In the above ninth preferred form of the invention, the controller further comprises third determining means for determining whether the attitude control device is able to normally function to achieve the attitude control, and fourth determining means for determining the decelerating time such that the decelerating time is longer when the third determining means determines that the attitude control device is not able to normally function, than when the third determining means determines that the attitude control device is able to normally function.

However, the vehicle attitude control system according to the present invention is applicable to a front-drive 4-wheel vehicle having a front right and a front left wheel which are driving wheels, and a rear right and a rear left wheel which are non-driving wheels. In this case, the deceleration control device is adapted to reduce an output torque of an engine of the vehicle to reduce rotating speeds of the front right and left wheels for thereby decelerating the vehicle, and the controller comprises the first determining means described above with respect to the ninth preferred form of the invention, and second determining means for determining the deceleration time described above, such that the deceleration time is shorter when the vehicle has the drift-out tendency than when the vehicle has the spinning tendency.

Alternatively, the deceleration control device may be adapted to activate brakes for the front and rear wheels to reduce the rotating speeds of the wheels for thereby decelerating the vehicle, and the controller comprises the first determining means described above with respect to the ninth preferred form of the invention, and second determining means for determining the deceleration time described above, such that the deceleration time is shorter for the front wheels than for the rear wheels when the vehicle has the drift-out tendency, and such that the deceleration time is shorter for the rear wheels than for the front wheels when the vehicle has the spinning tendency.

Further alternatively, the attitude control device is adapted to control the steering angle of the rear wheels to thereby effect the attitude control, while the deceleration control device is adapted to activate at least one of brakes for a plurality of wheels of the vehicle, to thereby effect the deceleration control.

Further, the deceleration control device may be adapted to terminate the deceleration control when a predetermined deceleration time has passed after a predetermined condition of the vehicle for initiating the deceleration control is satisfied.

According to a tenth preferred form of the invention, the deceleration control device terminates the deceleration control when a predetermined condition of the vehicle for terminating the deceleration control is satisfied. In one arrangement of this form of the invention, the predetermined condition of the vehicle for terminating the deceleration condition is satisfied when the attitude control by the attitude control device is terminated.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 7 is a graph indicating an example of a relationship among a vehicle turning characteristic value $\gamma \cdot \Delta \gamma$, a braking system condition and a deceleration time $T_D$, in the vehicle attitude control system;

FIG. 8 is a plan view for explaining the signs of an actual yaw rate $\gamma$ of the vehicle and turning characteristics of the vehicle;

FIG. 10 is a flow chart illustrating a deceleration control routine executed by a deceleration control device of the vehicle attitude control system of FIG. 9.

DETAILED DESCRIPTION OF THE PREFERRED EMBODIMENTS

Figure 1:
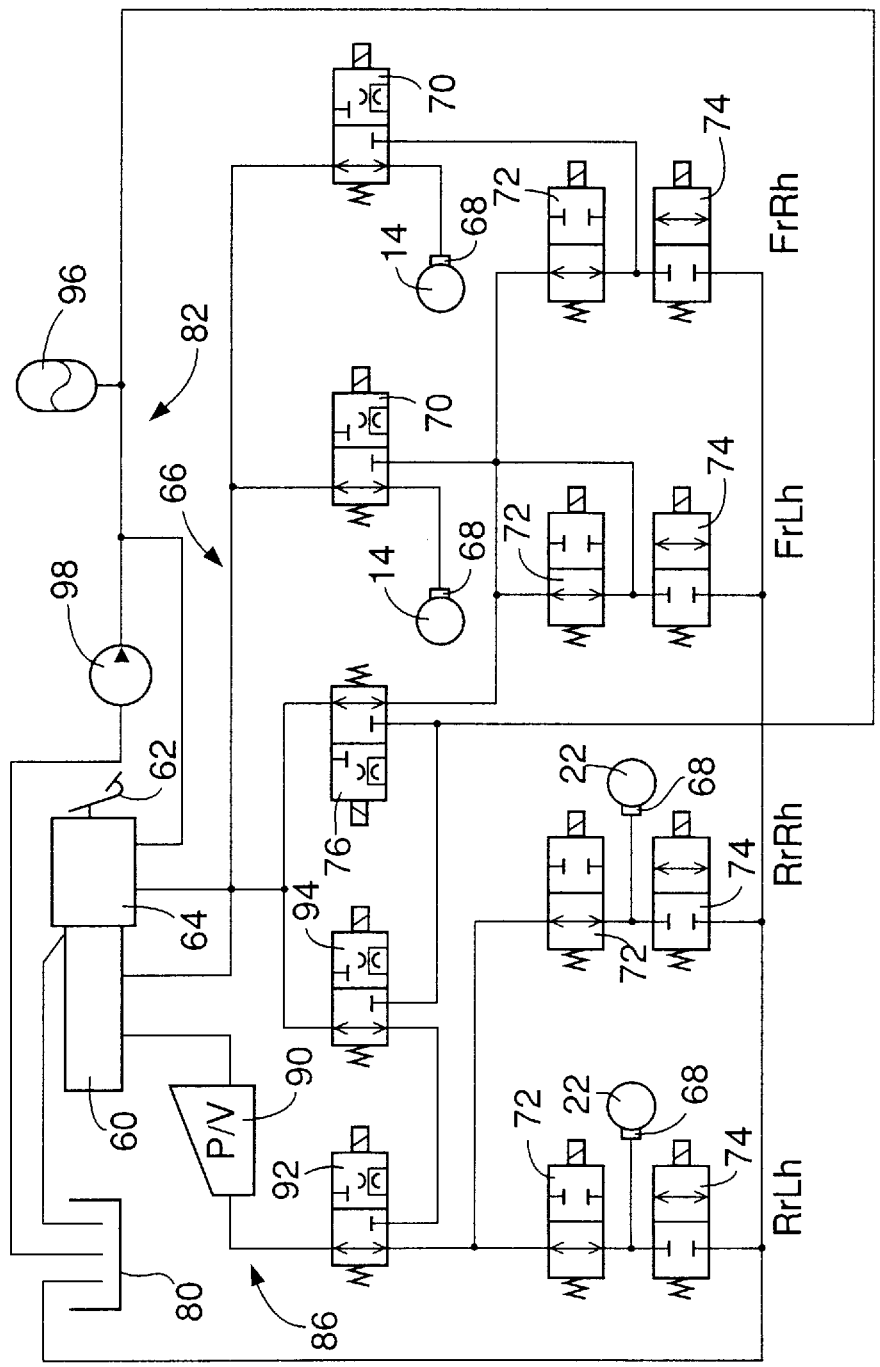
FIG. 1 is a schematic view illustrating a manually and electrically controlling braking system for a motor vehicle, which is used by a braking control device of a vehicle attitude control system constructed according to one embodiment of this invention.

Referring to the accompanying drawings, there will be described in detail some preferred embodiments of the vehicle attitude control system of this invention, which are adapted to be installed on a rear-drive four-wheel motor vehicle wherein a rear right and a rear left wheel are driven by an engine, with a front right and a front left wheel serving as idler or non-driving wheels. The rear wheels will be referred to as "driving wheels" where appropriate.

The vehicle attitude control system includes an attitude control device in the form of a braking control device and a deceleration control device. The braking control device is adapted to apply an attitude control brake to the motor vehicle so as to control the attitude of the vehicle. The braking control device uses a manually and electrically controlled braking system provided on the vehicle, so that the right and left wheels are braked independently of each other so as to establish a suitable difference between the braking forces of the right and left wheels, for thereby suitably controlling the yaw moment of the vehicle to stabilize the vehicle attitude. On the other hand, the deceleration control device is adapted to reduce the output of an engine of the vehicle and reduce the rotating speeds of the rear driving wheels, for thereby decelerating the vehicle or lowering the running speed of the vehicle before the attitude or yaw moment control brake is applied to the vehicle.

Referring to the schematic view of FIG. 1, there is shown a mechanical arrangement of the manually and electrically controlled braking system, which will be described. While this braking system is used by the braking control device of the present vehicle attitude control system, the braking system is also used by an anti-lock (anti-skid) brake control device and a traction control device. Accordingly, the braking system includes elements necessary for anti-lock control of the braking pressure or force for each wheel and for traction control of the rear driving wheels. Those elements will be also explained. It is noted that the "anti-lock control" is interpreted to mean controlling the braking pressure for each wheel to regulate the braking torque of the wheel while preventing locking or skidding of the wheel on the road surface during brake application to the vehicle, and that the "traction control" is interpreted to mean controlling at least one of the driving torque and the braking torque of the rear driving wheels so as to prevent slipping or spinning of the driving wheels on the road surface, upon starting or abrupt acceleration of the vehicle, in particular.

The braking system is provided with front brakes 14 for the front right and left wheels and rear brakes 22 for the rear right and left wheels, and a master cylinder 60 of tandem type. The master cylinder 60 has two mutually independent pressurizing chambers arranged in series. Upon operation of a brake operating member in the form of a brake pedal 62, a depression force acting on the brake pedal 62 is boosted by a brake booster 64, and the master cylinder 60 is activated by the boosted force so as to produce fluid pressures in the two pressurizing chambers, according to the boosted force received from the brake booster 64.

One of the two pressurizing chambers of the master cylinder 60 is connected through a primary fluid passage 66 to front wheel brake cylinders 68 of the front right and left brakes 14. The primary fluid passage 66 consists of a common passage portion connected to the appropriate pressurizing chamber, and two branch passage portions which connect the common passage portions and the respective front wheel brake cylinders 68.

In each of the two branch passage portions of the primary fluid passage 66, there is provided a master cylinder cut valve 70, which is a solenoid-operated directional control valve. This master cylinder cut valve 70 is normally placed in a position for connecting the wheel brake cylinder 68 to the master cylinder 60. Upon operation of the braking control device of the vehicle attitude control system or the anti-lock brake control device, the cut valve 70 is switched to a position for disconnecting the wheel brake cylinder 60 from the master cylinder 60 and connecting the wheel brake cylinder 68 to a pressure increasing valve 72 and a pressure reducing valve 74. The pressure increasing and reducing valves 72, 74 are solenoid-operated pressure regulating valves in the form of shut-off valves. The pressure increasing valve 72 is connected to a selector valve 76, which is a solenoid-operated flow control valve. The selector valve 76 is normally placed in a position for connecting the pressure increasing valve 72 to a reservoir 80 through the brake booster 64. Upon operation of the braking control device of the vehicle attitude control system, the selector valve 76 is switched to a position for disconnecting the pressure increasing valve 72 from the reservoir 80 and connecting the valve 72 to an electrically controlled hydraulic pressure source 82, so that the front wheel brake cylinder 68 of the front brake 14 is activated by a pressurized fluid supplied from the electrically controlled hydraulic pressure source 82. The pressure reducing valve 74 is connected to the reservoir 80.

The other pressurizing chamber of the master cylinder 60 is connected through another primary fluid passage 86 to rear wheel brake cylinders 68 of the rear right and left brakes 22. Like the primary fluid passage 66, the primary fluid passage 86 consists of a common passage portion connected to the appropriate pressurizing chamber of the master cylinder 60, and two branch passage portions connected to the rear wheel brake cylinders 68.

In the common passage portion of the primary fluid passage 86, there is provided a proportioning valve 90 (abbreviated as "P/V" in FIG. 1). As well known in the art, the proportioning valve 90 is adapted to function as a pressure reducing valve for the rear wheel brake cylinders 68 when the pressure in the master cylinder 60 exceeds a predetermined threshold. Namely, when the pressure in the master cylinder 60 is lower than the predetermined threshold, the pressure as generated by the master cylinder 60 is applied through the proportioning valve 90 to the rear wheel brake cylinders 68. When the pressure in the master cylinder 60 is higher than the predetermined threshold, the pressure generated by the master cylinder 60 is reduced at a predetermined ratio, and the thus reduced pressure is applied to the rear wheel brake cylinders 68.

Between the proportioning valve 90 and the end of the common passage portion of the primary fluid passage 86 remote from the master cylinder 60, there is provided a master cylinder cut valve 92, which is a solenoid-operated directional control valve. This cut valve 92 is normally placed in a position for connecting the rear wheel brake cylinders 68 to the master cylinder 60. Upon operation of the braking control device of the vehicle attitude control system or the traction control device, the cut valve 92 is switched to a position for disconnecting the rear wheel brake cylinders 68 from the master cylinder 60 and connecting the brake cylinders 68 to a selector valve 94, which is a solenoid-operated directional control valve. The selector valve 94 is placed in a position for connecting the master cylinder cut valve 92 to the reservoir 80 through the brake booster 64. When the braking portion of the vehicle attitude control system or the traction control device is activated, the selector valve 94 is switched to a position for disconnecting the master cylinder cut valve 92 from the reservoir 80 and connecting the cut valve 92 to the electrically controlled hydraulic pressure source 82. Therefore, when the braking portion of the vehicle control system is activated, the rear wheel brake cylinders 68 are operated by the pressurized fluid supplied from the hydraulic pressure source 82.

In each of the two branch passage portions of the primary fluid passage 86, there is provided a pressure increasing valve 72 which is a solenoid-operated pressure regulating valve in the form of a shut-off valve. Each rear wheel brake cylinder 68 is connected to the reservoir 80 through a pressure reducing valve 74 which is also a solenoid-operated pressure regulating valve in the form of a shut-off valve.

The electrically controlled hydraulic pressure source 82 includes an accumulator 96 for storing a working fluid under pressure, and a pump 98 for pressurizing the fluid pumped up from the reservoir 80 and delivering the pressurized fluid into the accumulator 96. The pump 98 is controlled by a computer (not shown) so that the fluid pressure in the accumulator 96 is maintained within a predetermined range.

While there has been described the braking system used as a mechanical part of the braking control device of the vehicle attitude control system, there will next be described a mechanical part of the deceleration control device of the vehicle attitude control system.

Figure 2:
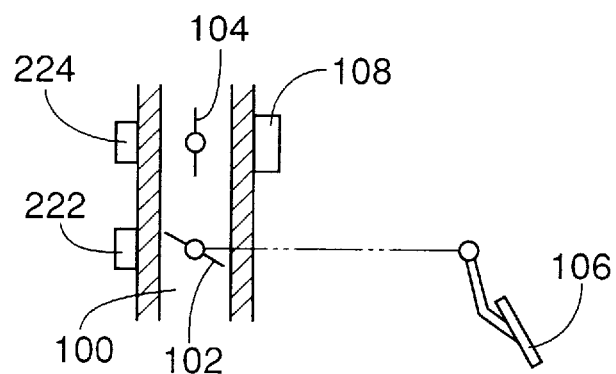
FIG. 2 is a side elevational view in cross section of an air suction system of an engine of the vehicle, which is used by a deceleration control device of the vehicle attitude control system.

The deceleration control device is adapted to reduce the engine output of the vehicle for thereby decelerating the vehicle. Described in detail, the engine output is reduced by reducing an amount of opening of a secondary throttle valve 104, which is disposed in a suction passage 100 of the engine, in series with a main throttle valve 102, as shown in FIG. 2. The main throttle valve 102 is a valve which is mechanically linked with a vehicle accelerating member in the form of an accelerator pedal 106 and which is operated by an amount corresponding to an amount of depression of the accelerator pedal 106. On the other hand, the secondary throttle valve 104 is operated by a throttle actuator 108 which is automatically controlled by the deceleration control device of the vehicle attitude control system, as described below.

While the mechanical arrangements of the braking and deceleration control devices of the vehicle attitude control system have been described, there will be described electrical control arrangements of those control devices.

Figure 3:
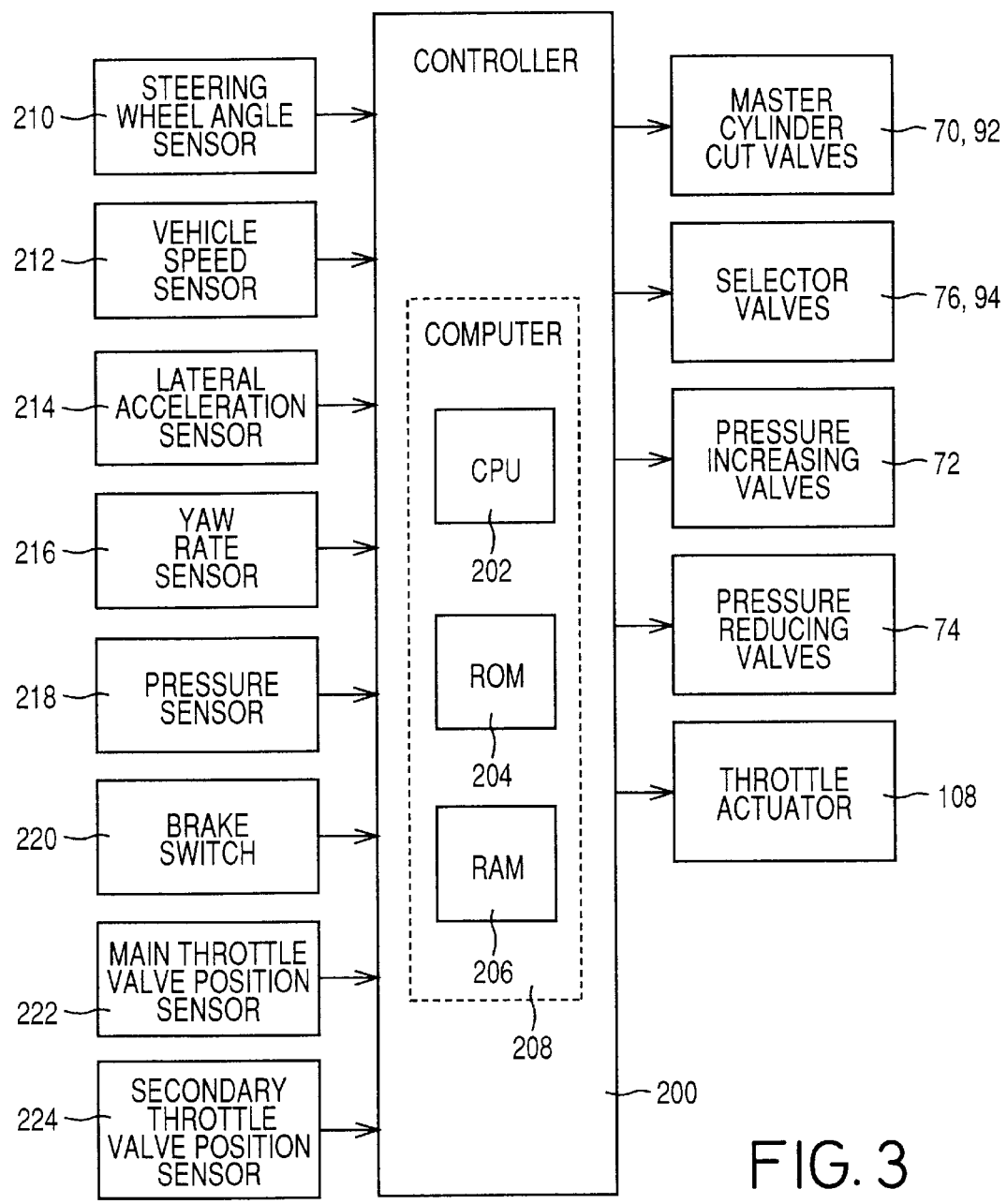
FIG. 3 is a block diagram illustrating an electric control arrangement of the vehicle attitude control system.

The vehicle attitude control system is equipped with a controller 200 as shown in FIG. 3. The controller 200 is principally constituted by a computer 208 which incorporates a central processing unit (CPU) 202, a read-only memory (ROM) 204 and a random-access memory (RAM) 206. The controller 200 is adapted to receive output signals of a steering wheel angle sensor 212, a vehicle speed sensor 212, a lateral acceleration sensor 214, a yaw rate sensor 216, pressure sensors 218, a brake switch 220, a main throttle valve position sensor 222 and a secondary throttle valve position sensor 224.

The output signal of the steering wheel angle sensor 210 represents an angle δH of rotation of a steering wheel by the vehicle operator. The output signal of the vehicle speed sensor 212 represents a running speed V of the vehicle. The output signal of the lateral acceleration sensor 214 represents a lateral acceleration $G_Y$ of the vehicle at its center of gravity. The output signal of the yaw rate sensor 216 represents a yaw rate γ of the vehicle. The yaw rate γ has a positive value when the yawing direction is clockwise, and a negative value when the yawing direction is counterclockwise. The output signals of the pressure sensors 218 represent the fluid pressures in the front and rear wheel brake cylinders 68, respectively. The output signal of the brake switch 220 indicates whether the brake pedal 62 has been operated. The output signal of the main throttle position sensor 222 represents an actual opening angle $θ_M$ of the main throttle valve 102, while the output signal of the secondary throttle position sensor 224 represents an actual opening angle $θ_S$ of the secondary throttle valve 104. The opening angles $θ_M$, $θ_S$ of the throttle valves 102, 104 as detected by these throttle position sensors 222, 224 are expressed as the opening percent values such that the percent value is 0% and 100% when the throttle valve 102, 104 is fully closed and fully open, respectively, that is, when the suction passage 100 is fully closed and fully opened by the throttle valve 102, 104.

The controller 200 is also adapted to control a brake actuator including the solenoid-operated master cylinder cut valves 70, 92, selector valves 76, 94 and pressure increasing and reducing valves 72, 74, and also control the throttle actuator 108.

Figure 4:
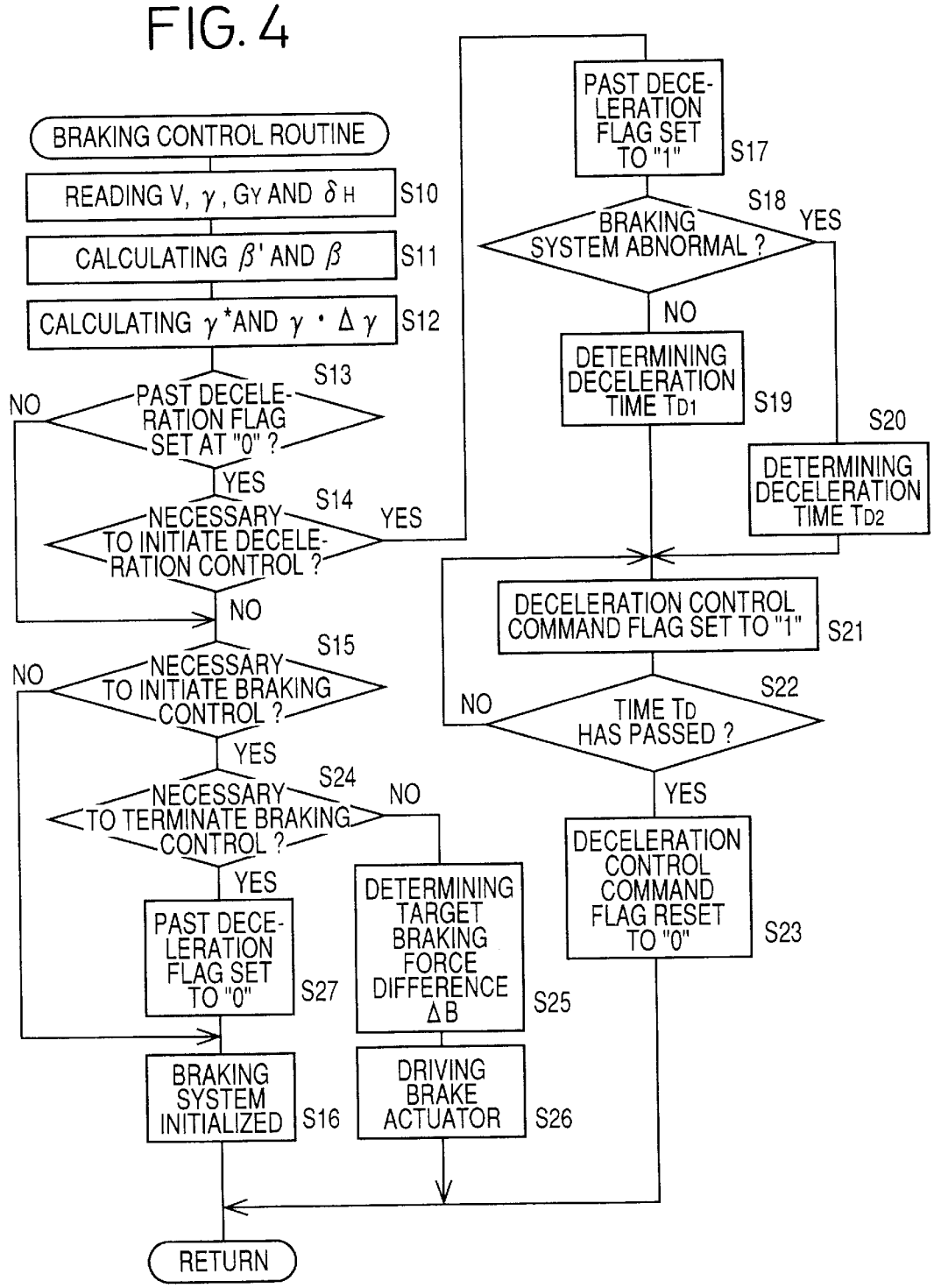
FIG. 4 is a flow chart illustrating a braking control routine stored in a read-only memory of a controller shown in FIG. 3.
Figure 5:
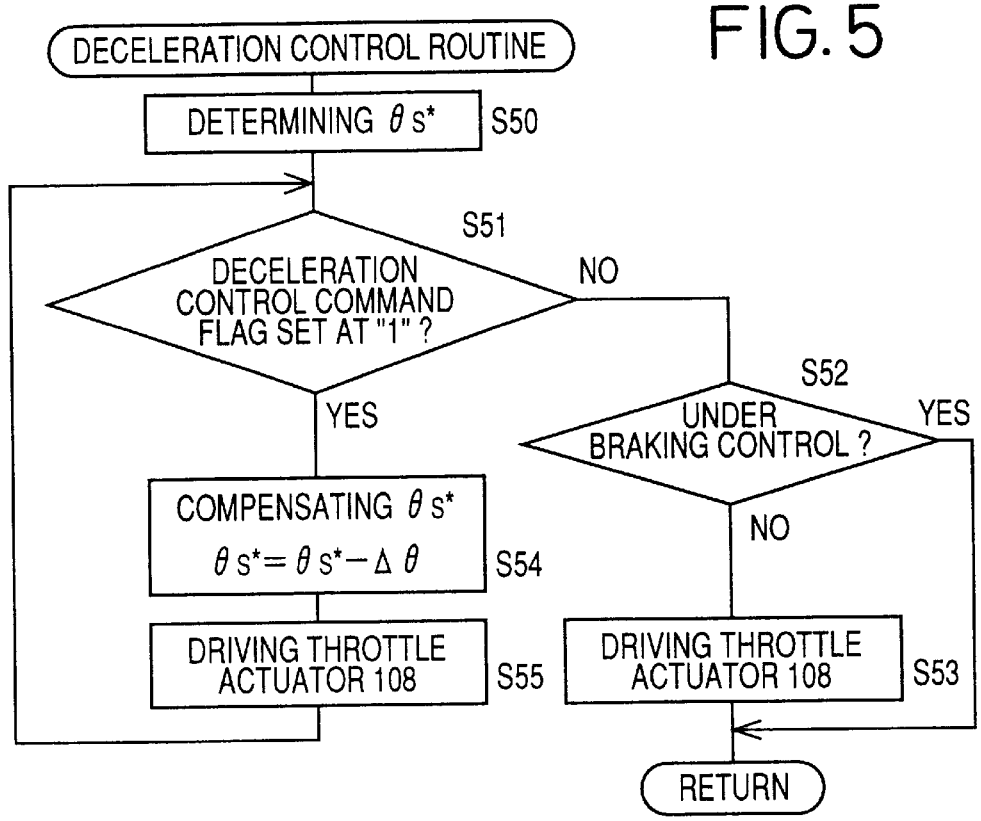
FIG. 5 is a flow chart illustrating a deceleration control routine stored in the read-only memory of FIG. 3.

The ROM 204 of the controller 200 stores various control programs such as those for executing a braking control routine illustrated in the flow chart of FIG. 4 and a deceleration control routine illustrated in the flow chart of FIG. 5. According to these control programs, the CPU 202 operates to control the brake actuator 70, 72, 74, 76, 92, 94, of the braking system and the throttle actuator 108 for the secondary throttle valve 104, for effecting the braking and deceleration controls so as to control the attitude of the vehicle, while utilizing a temporary data storage function of the RAM 206. There will be explained the braking control routine and the deceleration control routine. Initially, these routines are described briefly.

The controller 200 determines, on the basis of the output signals of the various sensors, whether a predetermined condition of the vehicle for initiating the braking control has been satisfied, and whether a predetermined condition of the vehicle for initiating the deceleration control has been satisfied. These vehicle conditions are determined so that the condition for initiating the deceleration control is more likely to be satisfied than the condition for initiating the braking control. If the controller 200 determines that the predetermined vehicle condition for initiating the deceleration control has been satisfied, the controller 200 generates a deceleration control command to effect the deceleration control.

Figure 6:
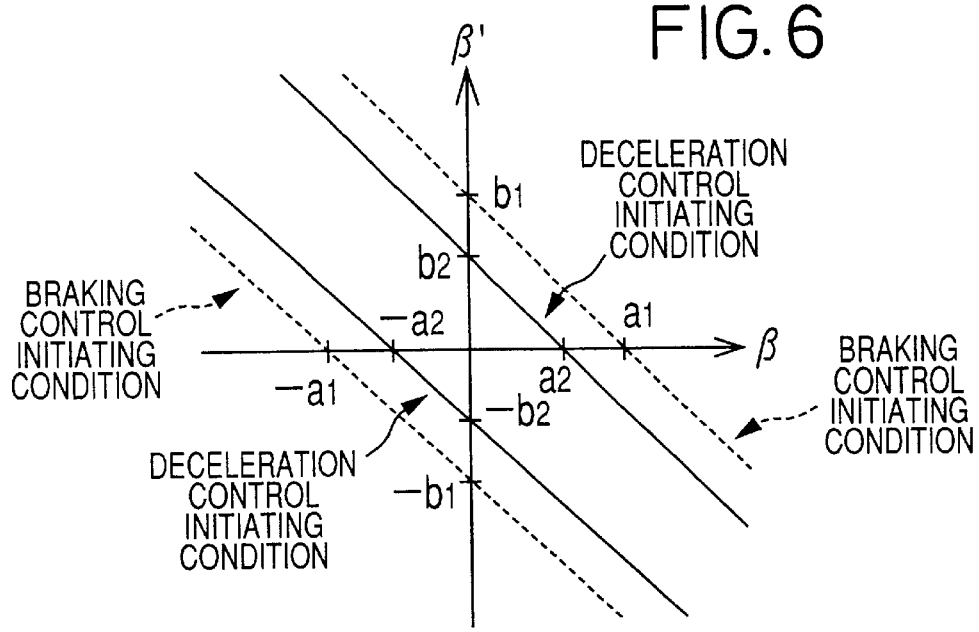
FIG. 6 is a graph indicating a braking control initiating condition and deceleration control initiating condition which are used in the vehicle attitude control system.

Described more specifically, the predetermined condition for initiating the braking control is satisfied when the following formula as represented by broken lines in the graph of FIG. 6 is satisfied:

$$|β/a_1+β'/b_1| \geq 1$$

where, β represents a lateral slip angle of the vehicle body, while β' represents a rate of change of the lateral slip angle β.

The predetermined condition for initiating the deceleration control is satisfied when the following formula as represented by solid lines in FIG. 6 is satisfied:

$$|β/a_2+β'/b_2| \geq 1$$

In the above formulas, $a_1$, $a_2$, $b_1$ and $b_2$ are positive integers, and $a_1$ is larger than $a_2$, while $b_1$ is larger than $b_2$.

The controller 200 is adapted such that the deceleration control is continued as long as the deceleration control command remains present. During a time period of the deceleration control, the actual opening angle $\theta_S$ of the secondary throttle valve 104 is decremented by a predetermined decrement amount. This time period is represented by a deceleration time $T_D$. The amount of decrease of the actual opening angle $\theta_S$ of the secondary throttle valve 104 from a normal value increases with an increase in the deceleration time $T_D$. The output of the vehicle engine decreases with an increase in the amount of decrease of the actual opening angle $\theta_S$, whereby the rotating speeds of the rear driving wheels and the running speed V of the vehicle decrease with the increase in the amount of decrease of the actual opening angle $\theta_S$.

The controller 200 is also adapted to determine, on the basis of the output signals of the various sensors, whether the vehicle has a "drift-out" tendency or a "spinning" tendency as explained above, and determine the deceleration time $T_D$ such that the time $T_D$ is longer when the controller determines that vehicle has the drift-out tendency than when the controller determines that the vehicle has the spinning tendency, as indicated in the graph of FIG. 7.

When the vehicle has a high drift-out or spinning tendency, it is required to decelerate the vehicle before the yaw moment control or attitude control brake is applied to the vehicle. That is, the deceleration control should precede the braking control for stabilizing the attitude of the turning vehicle. However, the present embodiment is not adapted to effect the deceleration control for all of the four wheels, but is adapted to effect the deceleration control for only the rear driving wheels. The deceleration of the rear wheels results in an increase in the slip ratios of the rear wheels in the longitudinal or running direction of the vehicle, and a decrease in the lateral forces acting on the rear wheels. Further, a decrease in the lateral forces of the rear wheels results in an increase in the yaw moment which causes the rear wheels to go outward away from the direction of a turn, namely, causes a spinning tendency of the vehicle. Accordingly, the deceleration of the rear wheels is effective to reduce the drift-out tendency of the vehicle, but is likely to increase the spinning tendency of the vehicle. In the light of this fact, the amount of decrease of the rotating speeds of the rear wheels by the deceleration control, that is, the deceleration time $T_D$ is determined to be longer when the controller 200 determines that the vehicle has the drift-out tendency than when the controller 200 determines that the vehicle has the spinning tendency.

The controller 200 is further adapted to determine whether the braking system is normal and capable of effecting the braking control, and determine the deceleration time $T_D$ such that the deceleration time $T_D$ is longer when the controller 200 determines that the braking system is abnormal, than when the controller 200 determines that the braking system is normal, as indicated in the graph of FIG. 7.

Referring to the flow chart of FIG. 4, the braking control routine will be described in detail.

This braking control routine is repeatedly executed. In each cycle of execution of the routine, step S10 is initially implemented to read the running speed V, actual yaw rate $\gamma$, lateral acceleration $G_Y$ and steering wheel angle $\delta_H$ of the vehicle, which are represented by the appropriate sensors described above. Then, the control flow goes to step S11 to calculate the rate of change $\beta'$ of the lateral slip angle $\beta$, and the lateral slip angle $\beta$ per se. In this respect, it is noted that no sensor is provided to detect the lateral slip angle $\beta$, and the change rate $\beta'$ is first obtained by calculation according to the following equation, for example:

$$\beta' = G_Y/V - \gamma$$

Then, the lateral slip angle $\beta$ is calculated by integrating the calculated values of the change rate $\beta'$ in the present embodiment. It is noted that the change rate $\beta'$ is a derivative of the slip angle $\beta$.

Step S11 is followed by step S12 to calculate a target yaw rate $\gamma^*$ of the vehicle and a vehicle turning characteristic value $\gamma \cdot \Delta\gamma$ on the basis of the values obtained in step S10. The target yaw rate $\gamma^*$ is calculated on the basis of the steering wheel angle $\delta_H$ and the vehicle speed V. The target yaw rate $\gamma^*$ is a desired value of the actual yaw rate $\gamma$ which is generated if the vehicle is turning along a circular arc in a steady state (at a substantially constant speed). In this respect, it is noted that the turning vehicle can be considered to be turning along a circular arc at each instantaneous moment. For example, the target yaw rate $\gamma^*$ may be calculated on an assumption that a response of the target yaw rate $\gamma^*$ to the steering wheel angle $\delta_H$ is expressed by the following transfer function:

$$V/(N \cdot L \cdot \{1 + A \cdot V^2\}),$$

where V:vehicle speed
N:steering gear ratio
L:wheel base
A:stability factor

On the other hand, the vehicle turning characteristic value $\gamma \cdot \Delta\gamma$ is calculated as a product of the actual yaw rate $\gamma$ and a yaw rate error $\Delta\gamma$ which is a difference or deviation of the actual yaw rate $\gamma$ from the target yaw rate $\gamma^*$. This characteristic value $\gamma \cdot \Delta\gamma$ is positive when the vehicle has a drift-out tendency, regardless of whether the vehicle is turning clockwise or counterclockwise, and is negative when the vehicle has a spinning tendency, regardless of the clockwise or counterclockwise turning of the vehicle. The absolute value of the vehicle turning characteristic value $\gamma \cdot \Delta\gamma$ increases with an increase in the yaw rate error $\Delta\gamma$ between the actual and target yaw rate values $\gamma$ and $\gamma^*$. Accordingly, the characteristic value $\gamma \cdot \Delta\gamma$ represents both the direction of deviation of the actual vehicle attitude from the desired attitude, and the magnitude or amount of this deviation.

The control flow then goes to step S13 to determine whether a PAST DECELERATION flag is set at "0". When this flag is set at "0", it indicates that the deceleration control has not been effected. When the flag is set at "1", it indicates that the deceleration control has ever been effected. The PAST DECELERATION flag, which is stored in the RAM 206, is reset to "0" when the controller 200 is turned on. In the first cycle of execution of the routine of FIG. 4 after power application to the controller 200, therefore, an affirmative decision (YES) is obtained in step S13, and the control flow goes to step S14 to determine whether it is necessary to initiate the deceleration control, more specifically, whether the predetermined condition for initiating the deceleration control is satisfied or not, that is, the above-indicated formula $|\beta/a_2 + \beta'/b_2| \geq 1$ is satisfied or not.

If the deceleration control initiating condition is not satisfied, it means that it is not necessary to initiate the deceleration control, and a negative decision (NO) is obtained in step s14. In this case, the following step S15 is implemented to determine whether it is necessary to initiate the braking control, more specifically, whether the predetermined condition for initiating the braking control is satisfied or not, that is, the above-indicated formula $|\beta/a_1 + \beta'/b_1| \geq 1$ is satisfied or not. In the case where the deceleration control initiating condition is not satisfied, the braking control initiating condition is not satisfied, and the braking control is not required to be initiated. In this case, a negative decision (NO) is obtained in step S16, and the control flow goes to step S16 to initialize the braking system to the normal condition.

If the deceleration control becomes necessary due to a change in the vehicle running condition during repeated execution of the braking control routine, an affirmative decision (YES) is obtained in step S14, and the control flow goes to step S17 to set the PAST DECELERATION flag to "1", and then to step S18 to determine whether the braking system is abnormal and is unable to correctly effect the braking control which may follow the deceleration control. Described in detail, step S18 is implemented to check the electric control system of the braking system for any abnormality or defects. If a negative decision (NO) is obtained in step S18, the control flow goes to step S19 to determine $T_{D1}$ as the deceleration time $T_D$. If an affirmative decision (YES) is obtained in step S18, on the other hand, the control flow goes to step S20 to determine $T_{D2}$ as the deceleration time $T_D$. That is, the deceleration time $T_D$ is determined depending upon whether the braking system is abnormal or normal, as indicated in FIG. 7. Further, the deceleration time $T_D$ ($T_{D1}$ or $T_{D2}$) is determined in step S19 or S20 on the basis of the vehicle turning characteristic value $\gamma \cdot \Delta \gamma$ representative of the vehicle spinning or drift-out tendency, as explained above. To this end, the ROM 204 stores data tables or functional equations representative of predetermined two relationships between the deceleration time $T_D$ and the vehicle turning characteristic value $\gamma \cdot \Delta \gamma$. The two relationships correspond to the abnormal and normal states of the braking system and are indicated by the broken and solid lines in FIG. 7, respectively. In step S19, the relationship indicated by the solid line is selected, and the deceleration time $T_{D1}$ is determined according to this relationship and on the basis of the characteristic value $\gamma \cdot \Delta \gamma$. In step S20, the relationship indicated by the broken line is selected, and the deceleration time $T_{D2}$ is similarly determined.

In either case, step S21 is then implemented to set a DECELERATION CONTROL COMMAND flag to "1". When this flag is set at "0", it indicates that the deceleration control is not necessary. When the flag is set at "1", it indicates that the deceleration control is necessary. This DECELERATION CONTROL COMMAND flag is stored in the RAM 206, and is reset to "0" when the controller 200 is turned on. Step S21 is followed by step S22 to determine whether the deceleration time $T_D$ determined in step S19 or S20 has passed. If a negative decision (NO) is obtained in step S22, the control flow returns to step S21. In other words, steps S21 and S22 are repeatedly implemented until the deceleration time $T_D$ has passed. During this period, the DECELERATION CONTROL COMMAND flag is kept at "1". Then, the control flow goes to step S23 to reset the DECELERATION CONTROL COMMAND flag to "0", and one cycle of execution of the braking control routine of FIG. 4 is terminated.

In the next cycle of execution of the present routine, a negative decision (NO) is obtained in step S13, and the control flow goes to step S15 and the subsequent steps while skipping steps S14 and 17–S23.

As described above, step S15 is provided to determine whether it is necessary to initiate the braking control. A drift-out tendency or spinning tendency of the motor vehicle may be eliminated by the prior deceleration control which has been effected according to the deceleration control routine of FIG. 5 as a result of the affirmative decision in step S14 and the setting of the DECELERATION CONTROL COMMAND flag to "1" in step S21. In this case, the predetermined braking control initiating condition is not satisfied, namely, it is no longer necessary to effect the braking control to eliminate the drift-out or spinning tendency, and a negative decision (NO) is obtained in step S15, whereby one cycle of execution of the routine is terminated after the implementation of step S16. If the prior deceleration control has not sufficiently eliminated the drift-out or spinning tendency of the vehicle, the predetermined braking control initiating condition is satisfied, and an affirmative decision (YES) is obtained in step S15. IN this case, the control flow goes to step S24 and the subsequent steps.

Step S24 is provided to determine whether it is necessary to terminate the braking control. This determination may be made depending upon whether a predetermined braking control terminating condition is satisfied or not. The braking control terminating condition is similar to the braking control initiating condition, but is formulated so that the terminating condition is more likely to be satisfied than the initiating condition.

If it is not necessary to terminate the braking control, that is, if a negative decision (NO) is obtained in step S24, the control flow goes to step S25 to determine a target braking force difference $\Delta B$ on the basis of the vehicle turning characteristic value $\gamma \cdot \Delta \gamma$ and the sign of the actual yaw rate $\gamma$. The target braking force difference $\Delta B$ is a target value of a difference between the braking forces applied to the right and left wheels. Then, step S26 is implemented to drive the brake actuator 70, 72, 74, 76, 92, 94 so as to establish the determined target braking force difference $\Delta B$, while the fluid pressures in the wheel brake cylinders 68 are monitored by the pressure sensors 218. The present embodiment is adapted to apply a braking force to only one of the rear right and left wheels which is located inwardly of the turning direction of the vehicle, if the vehicle has a drift-out tendency, for example. In this case, the turning vehicle is given a yaw moment which reduces the drift-out tendency. If the vehicle has a spinning tendency, a braking force is applied to only one of the front right and left wheels which is located outwardly of the turning direction of the vehicle. In this case, the vehicle is given a yaw moment which reduces the spinning tendency. Thus, one cycle of execution of the routine is terminated.

The present braking control routine of FIG. 4 is adapted such that upon detection of an operation of the brake pedal 62 by the brake switch 220 during the braking control, the braking control is immediately stopped, and the braking system is restored to a normal braking state in which the wheel brake cylinders 68 are activated by the master cylinder 60.

By reference to the flow chart of FIG. 5, there will be described in detail the deceleration control routine.

This deceleration control routine, which is also repeatedly executed, is initiated with step S50 to determine a target value $\theta_S^*$ of the opening angle $\theta_S$ of the secondary throttle valve 104 to be a normal value, which is equal to the actual opening angle $\theta_M$ of the main throttle valve 102. The actual opening angle $\theta_M$ is detected by the main throttle valve position sensor 222. Then, the control flow goes to step S51 to determine whether the DECELERATION CONTROL COMMAND flag is set at "1". If this flag is set at "0", a negative decision (NO) is obtained in step S51, and the control flow goes to step S52 to determine whether the braking control is being effected. If a negative decision (NO) is obtained in step S52, the control flow goes to step S53 to drive the throttle actuator 108 so as to establish the target opening angle $\theta_S^*$ of the secondary throttle valve 104 while the actual opening angle $\theta_S$ is monitored by the secondary throttle valve position sensor 224. Thus, one cycle of execution of the routine of FIG. 5 is terminated.

Accordingly, if the deceleration control command is not present and the braking control is not being effected, the actual opening angle $\theta_S$ of the secondary throttle valve 104 is maintained at the target value $\theta_S^*$ which is equal to the actual opening angle $\theta_M$ of the main throttle valve 102. In other words, the secondary throttle valve 104 is controlled following the operation of the main throttle valve 102.

If the DECELERATION CONTROL COMMAND flag is set at "1", that is, if the affirmative decision (YES) is obtained in step S51, the control flow goes to step S54 to compensate the target opening angle $\theta_S^*$ of the secondary throttle valve 104, by subtracting a predetermined decrement amount $\Delta\theta$ from the currently effective target value $\theta_S^*$. When step S54 is implemented for the first time, the target opening angle $\theta_S^*$ which has been determined in step S50 and which is equal to the actual opening angle $\theta_M$ of the main throttle valve 102 is reduced by the predetermined increment amount $\Delta\theta$. Step S54 is followed by step S55 to drive the throttle actuator 108 so as to establish the target opening angle $\theta_S^*$ which has been compensated in step S54. As a result, the output torque of the engine is reduced from the normal value which corresponds to the normal value of the opening angle $\theta_S^*$ of the secondary throttle valve 104 (which is equal to the opening angle $\theta_M$. Then, the control flow goes to step S51.

When step S54 is implemented again, the target opening angle $\theta_S^*$ is decremented from the currently effective value which has been determined in the last implementation of the step S54. As long as the DECELERATION CONTROL COMMAND flat is set at "1", steps S51, S54 and S55 are repeatedly implemented to decrement the target opening angle $\theta_S^*$ by the predetermined decrement amount $\Delta\theta$, so that the output torque of the engine is decremented.

If the DECELERATION CONTROL COMMAND flag is reset to "0", the negative decision (NO) is obtained in step S51. If the braking control is being effected, an affirmative decision (YES) is obtained in step S52, and step S53 is not implemented. In this case, the opening angle $\theta_S$ of the secondary throttle valve 104 remains unchanged.

In the next cycle of execution of the routine, the target opening angle $\theta_S^*$ of the secondary throttle valve 104 is set in step S50, at the actual opening angle $\theta_M$ of the main throttle valve 102. If the DECELERATION CONTROL FLAG remains "0", the negative decision (NO) is obtained in step S51, and the control flow again goes to step S52 to determine whether the braking control is being effected. If the braking control still continues, the affirmative decision (YES) is again obtained in step S52, and the step S53 is not implemented. Namely, the opening angle $\theta_S$ of the throttle actuator 108 is not changed to the normal value which has been determined in step S50. Thus, step S53 continues to be skipped until the braking control is terminated. As a result, the target opening angle $\theta_S$ of the secondary throttle valve 104 is maintained at the target value $\theta_S^*$ which is determined in the last implementation of step S54. The present embodiment is adapted to inhibit the opening angle $\theta_S$ of the secondary valve 104 from being restored to the normal value immediately after the DECELERATION CONTROL COMMAND flag is reset to "0" (immediately after the negative decision is obtained in step S51). This arrangement is effective to prevent an increase in the vehicle speed V during the braking control, which would occur if the opening angle $\theta_S$ of the secondary throttle valve 104 was restored to the normal value immediately after the deceleration control command is removed. Such an increase in the vehicle speed V would result in a failure to adequately control the attitude of the turning vehicle.

It will be understood from the foregoing explanation of the present embodiment, the deceleration control precedes the braking control, or the braking control is effected only after the vehicle has been suitably decelerated by the deceleration control, so that the braking control provides an intended effect to reduce or eliminate the drift-out or spinning tendency, permitting improved steering and running stability of the vehicle.

According to the present embodiment the braking force difference $\Delta B$ of the right and left wheels to be produced by the braking control is smaller than that where the braking control is not preceded by the deceleration control. Accordingly, the load on the braking system is reduced, and a torsional load acting on the suspension system due to the produced braking force difference is reduced, leading to an increase in the durability of the vehicle.

In the present embodiment wherein the deceleration control is effected by controlling the secondary throttle valve 104 while the braking control is effected by controlling the brakes 14, 22, the deceleration and braking controls are effected by using different mechanisms. In this respect, too, the load on the brakes 14, 22 is reduced in the present embodiment than in the case where the brakes 14, 22 are used for both of the deceleration and braking controls, for example. The present arrangement is advantageous, for instance, in reducing the amount of wear of friction pads used in the brakes 14, 22.

It will be understood from the above explanation that the steering wheel angle sensor 210, vehicle speed sensor 212, lateral acceleration sensor 214 and yaw rate sensor 216 constitute an example of a vehicle condition sensor for detecting at least one physical value relating to the turning condition of the vehicle, while the brakes 14, 22, wheel brake cylinders 68, master cylinder cut valves 70, 92, selector valves 76, 94 and pressure increasing and reducing valves 72, 74 cooperate to constitute an example of an attitude control mechanism for controlling the attitude of the vehicle, and that a portion of the controller 200 assigned to execute the braking control routine of FIG. 4 constitutes an example of a controller for controlling the attitude control mechanism so as to control the vehicle attitude on the basis of an output of the vehicle condition sensor. It will also be understood that an example of a deceleration control device for decelerating the vehicle before operation of the attitude control mechanism is constituted by the steering wheel angle sensor 210, vehicle speed sensor 212, lateral acceleration sensor 214, yaw rate sensor 216, secondary throttle valve 104, throttle actuator 108 and a portion of the controller 200 assigned to implement steps s13-S24 of the braking control routine of FIG. 4 and the deceleration control routine of FIG. 5. It will be further understood that the secondary throttle valve 104 and the throttle actuator 108 constitute an example of a decelerating mechanism for decelerating the vehicle. Further, an example of a wheel deceleration amount controlling portion for controlling the amount of deceleration of at least one of the wheels of the vehicle on the basis of the lateral force generated between the wheel and the road surface is constituted by the steering wheel angle sensor 210, vehicle speed sensor 212, lateral acceleration sensor 214, yaw rate sensor 216, and a portion of the controller 200 assigned to implement steps S19 and S20 of FIG. 4. It will also be understood that an example of a vehicle deceleration amount controlling portion for controlling the amount of deceleration of the vehicle on the basis of an estimated effect of the braking control is constituted by a portion of the controller 200 assigned to implement steps S18–S20 of the braking control routine of FIG. 4. The deceleration control device include the wheel deceleration controlling portion and the vehicle deceleration amount controlling portion.

In the present embodiment, the braking control device and the deceleration control device of the vehicle attitude control system use the same controller 200. However, different controllers are used by the braking and deceleration control devices, respectively.

The present embodiment is arranged so inhibit the initiation of the braking control until the deceleration control for a predetermined deceleration time is terminated, even if the vehicle has an excessively large abnormal turning tendency, for example, an excessively large drift-out or spinning tendency. This arrangement which inhibit simultaneous operations of the braking and deceleration control devices of the vehicle attitude control system assures a freedom of the primary braking control from adverse influences of the auxiliary deceleration control. In some situations, however, it is required to initiate the braking control even during the deceleration control, and permit braking control simultaneously with the deceleration control, for rapidly stabilizing the undesirable attitude of the vehicle.

The above requirement may be met according to another embodiment of the present invention, which is different from the first embodiment only in the braking control routine and the deceleration control routine. In the interest of simplification, only these routines of the second embodiment will be described.

Figure 9:
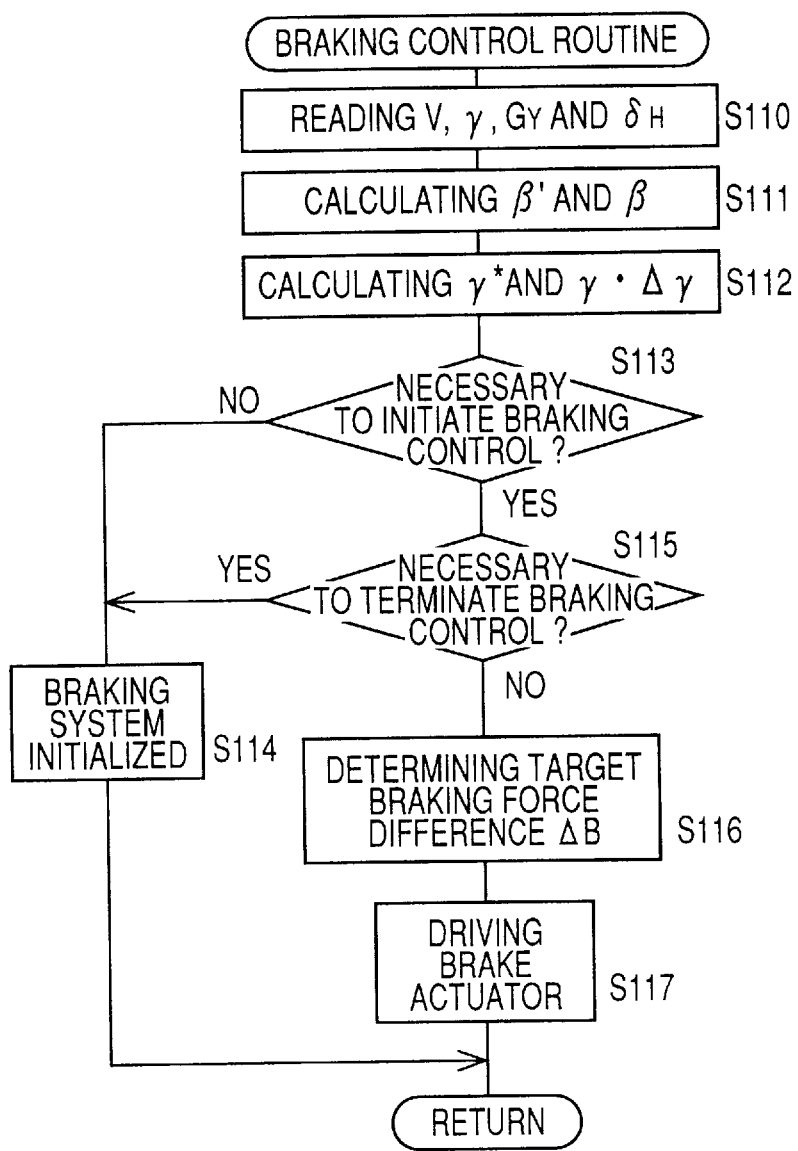
FIG. 9 is a flow chart illustrating a braking control routine executed by a braking control device of a vehicle attitude control system constructed according to another embodiment of the present invention.

The braking control routine of the second embodiment is illustrated in the flow chart of FIG. 9. Those steps of this routine similar to the corresponding steps of FIG. 4 will be only briefly described.

The braking control routine of FIG. 9, which is repeatedly executed, is initiated with step S110 similar to step S10, in which the controller 200 read the various physical values such as the vehicle speed V indicating the vehicle condition. Step S110 is followed by step S111 similar to step S11, in which the rate of change $\beta'$ of the lateral slip angle $\beta$ of the vehicle body and the lateral slip angle $\beta$ per se are calculated. Then, the control flow goes to step S112 similar to step S12, to calculate the target yaw rate $\gamma^*$ and the vehicle turning characteristic value $\gamma \cdot \Delta\gamma$.

Step S112 is followed by step S113 similar to step S15, to determine whether it is necessary to initiate the braking control, that is, whether the predetermined braking control initiating condition indicated above is satisfied or not. If a negative decision (NO) is obtained in step S113, the control flow goes to step S114 similar to step S16, in which the braking system is initialized to the normal state. Thus, one cycle of execution of the routine is terminated.

If it is necessary to initiate the braking control, namely, if an affirmative decision (YES) is obtained in step S113, the control flow goes to step S115 similar to step S24, to determine whether it is necessary to terminate the braking control. If a negative decision (NO) is obtained in step S115, the control flow goes to step S116 similar to step S25, to determine the target braking force difference $\Delta B$. Step S116 is followed by step S117 similar to step S26, to drive the brake actuator so as to establish the determined target braking force difference $\Delta B$. Thus, one cycle of execution of the routine is terminated.

The present braking control routine is executed regardless of whether the deceleration control is being effected or not. Therefore, if the vehicle has an excessively large abnormal turning tendency during the deceleration control, the braking control is initiated during the deceleration control, so that the abnormal turning tendency may be rapidly eliminated.

The deceleration control routine is illustrated in the flow chart of FIG. 10. Those steps of this routine similar to the corresponding steps of FIG. 5 will be only briefly described.

The deceleration control routine of FIG. 9, which is also repeatedly executed, is initiated with step S150 similar to step S50, in which the target opening angle $\theta_S^*$ of the secondary throttle valve 104 is determined. Step S151 similar to step S14 of FIG. 4 is then implemented to determine whether it is necessary to initiate the deceleration control, that is, whether the predetermined deceleration control initiating condition described above is satisfied or not. If it is not necessary to initiate the deceleration control, that is, if a negative decision (NO) is obtained in step S151, the control flow goes to step S152 to determine whether the braking control is being effected. If a negative decision (NO) is obtained in step S152, step S153 is implemented to drive the throttle actuator 108 so as to establish the determined target opening angle $\theta_S^*$ of the secondary throttle actuator 104. Thus, one cycle of execution of the routine of FIG. 10 is terminated.

If it is necessary to initiate the deceleration control, that is, if an affirmative decision (YES) is obtained in step S151, the control flow goes to step S154 similar to step S18, to determine whether the braking system is abnormal. If the braking system is not abnormal or if a negative decision (NO) is obtained in step S154, step S155 is implemented to determine the deceleration time $T_{D1}$. If an affirmative decision (YES) is obtained in step S154, step S156 is implemented to determine the deceleration time $T_{D2}$. IN either of these cases, the control flow then goes to step S157 to decrement the presently effective target opening angle $\theta_S^*$ of the secondary throttle valve 104 by the predetermined decrement amount $\Delta\theta$, to thereby compensate the target opening angle $\theta_S^*$. Step S157 is followed by step S158 to drive the throttle actuator 108 so as to establish the compensated target opening angle $\theta_S^*$. Subsequently, step S159 is implemented to determine whether the deceleration time $T_D$ has passed after the moment of the first implementation of step S157. If a negative decision (NO) is obtained in step S159, the control flow goes to step S157. If an affirmative decision (YES) is obtained in step S159, one cycle of execution of the routine is terminated.

In the present second embodiment, the deceleration control and the braking control may be effected independently of each other, and the braking control may be initiated even during the deceleration control, for effecting the braking control simultaneously with the deceleration control, so that the vehicle attitude can be rapidly stabilized.

It sill be understood from the above explanation of the second embodiment that the steering wheel angle sensor 210, vehicle speed sensor 212, lateral acceleration sensor 214 and yaw rate sensor 216 constitute an example of the vehicle condition sensor, while the brakes 14, 22, wheel brake cylinders 68, master cylinder cut valves 70, 92, selector valves 76, 94 and pressure increasing and reducing valves 72, 74 cooperate to constitute an example of the attitude control mechanism, and that a portion of the controller 200 assigned to implement steps S110–S117 of the braking control routine of FIG. 9 constitutes an example of the controller for controlling the attitude control mechanism. It will also be understood that an example of the deceleration control device is constituted by the steering wheel angle sensor 210, vehicle speed sensor 212, lateral acceleration sensor 214, yaw rate sensor 216, secondary throttle valve 104, throttle actuator 108 and a portion of the controller 200 assigned to implement steps S150–S159 of the deceleration control routine of FIG. 10. It will be further understood that the secondary throttle valve 104 and the throttle actuator 108 constitute an example of the decelerating mechanism for decelerating the vehicle. Further, an example of the wheel deceleration amount controlling portion is constituted by the steering wheel angle sensor 210, vehicle speed sensor 212, lateral acceleration sensor 214, yaw rate sensor 216, and a portion of the controller 200 assigned to implement steps S155 and S156 of FIG. 10. It will also be understood that an example of the vehicle deceleration amount controlling portion is constituted by a portion of the controller 200 assigned to implement steps S154–S156 of the deceleration control routine of FIG. 10. The deceleration control device include the wheel deceleration controlling portion and the vehicle deceleration amount controlling portions While the present invention has been described in detail above in its presently preferred embodiments, it is to be understood that the invention is not limited to the details of the illustrated embodiments, but may be embodied with various changes, modifications and improvements which may occur to those skilled in the art, without departing from the spirit and scope of the invention defined in the following claims.

What is claimed is:

1. A vehicle attitude control system for controlling an attitude of a motor vehicle, comprising:

an attitude control device including a vehicle condition sensor for detecting at least one physical value relating to a turning condition of the vehicle, an attitude control mechanism for controlling the attitude of the vehicle, and a controller for controlling the attitude control mechanism for effecting an attitude control so as to control the attitude of the vehicle on the basis of an output of said vehicle condition sensor; and a deceleration control device for effecting a deceleration control to decelerate said motor vehicle before said attitude control by said attitude control device is initiated.

2. A vehicle attitude control system according to claim 1, wherein said deceleration control device comprises a decelerating mechanism for decelerating said vehicle, said decelerating mechanism being different from said attitude control mechanism.

3. A vehicle attitude control system according to claim 1, wherein said motor vehicle has a plurality of wheels including at least one torque-controlled wheel, and said deceleration control device reduces a rotating torque of each of said at least one torque-controlled wheel, said deceleration control device comprising a wheel deceleration amount controlling portion for controlling an amount of reduction of a rotating speed of said each torque-controlled wheel by said deceleration control device such that said amount of reduction of said rotating speed is smaller where it is adequate to increase a lateral force which is generated between said each torque-controlled wheel and a road surface during said attitude control initiated after initiation of said deceleration control, than where it is not adequate to increase said lateral force.

4. A vehicle attitude control system according to claim 1, wherein said deceleration control device comprises a vehicle deceleration amount controlling portion for controlling an amount of reduction of a running speed of said vehicle by said deceleration control device such that said amount of reduction of said running speed is larger where said attitude control initiated after initiation of said deceleration control is not expected to provide an intended effect of controlling the attitude of the vehicle, than where said attitude control is expected to provide said intended effect.

5. A vehicle attitude control system according to claim 1, wherein said vehicle condition sensor comprises a sensor for detecting a running speed of said motor vehicle, and a sensor for detecting an angle of rotation of a steering wheel of the vehicle, and said controller controls said attitude control mechanism on the basis of said running speed and said angle of rotation of said steering wheel.

6. A vehicle attitude control system according to claim 1, wherein said vehicle condition sensor comprises a sensor for detecting one of a lateral acceleration and a yaw rate of the vehicle, and said controller controls said attitude control mechanism on the basis of said one of said lateral acceleration and yaw rate of the vehicle.

7. A vehicle attitude control system according to claim 1, wherein said attitude control mechanism comprises a brake actuator capable of braking right and left wheels of the vehicle independently of each other, and said controller controls said brake actuator so as to generate a difference between braking forces to be applied to said right and left wheels, for thereby controlling a yaw moment of the vehicle to thereby effect said attitude control to control the attitude of the vehicle.

8. A vehicle attitude control system according to claim 1, wherein said controller comprises first determining means for determining whether a predetermined first condition of the vehicle for initiating said attitude control by said attitude control device is satisfied, and second determining means for determining whether a predetermined second condition of the vehicle for initiating said deceleration control by said deceleration control device is satisfied, said first and second conditions of the vehicle being determined such that said second condition is more likely to be satisfied than said first condition, said controller generating a deceleration command to initiate said deceleration control when said predetermined second condition is satisfied.

9. A vehicle attitude control system according to claim 8, wherein said first determining means determines that said predetermined first condition of the vehicle is satisfied when the following formula is satisfied:

$$|\beta/a_1+\beta'/b_1| \geq 1$$

wherein, $\beta$ represents a lateral slip angle of a body of the vehicle while $\beta'$ represents a rate of change of said lateral slip angle, and $a_1$ and $b_1$ are positive integers, and wherein said second determining means determines that said predetermined second condition of the vehicle is satisfied when the following formula is satisfied:

$$|\beta/a_2+\beta'/b_2| \geq 1$$

wherein, $a_2$ and $b_2$ are positive integers which are smaller than $a_1$ and $b_1$, respectively.

10. A vehicle attitude control system according to claim 8, wherein said deceleration control device is held operated to continue said deceleration control while said deceleration command is generated from said controller.

11. A vehicle attitude control system according to claim 8, wherein said controller inhibits said first determining means from operating to determine whether said predetermined first condition of the vehicle is satisfied, until a predetermined deceleration time has passed after said deceleration control is initiated upon determination by said second determining means that said predetermined second condition of the vehicle is satisfied, whereby said controller inhibits said attitude control device from initiating said attitude control until said deceleration time has passed.

12. A vehicle attitude control system according to claim 8, wherein said first determining means and said second determining means are operated in parallel with each other, and said controller permits said attitude control device to operate even during said deceleration control, if said first determining means determines that said predetermined first condition of the vehicle is satisfied, after initiation of said deceleration control by said deceleration control device.

13. A vehicle attitude control system according to claim 1, wherein said deceleration control device comprises an engine torque control mechanism for controlling an output torque of an engine of the vehicle so as to decelerate the vehicle.

14. A vehicle attitude control system according to claim 13, wherein said engine torque control mechanism comprises a throttle valve disposed in a suction passage of said engine, and a throttle actuator for reducing an opening angle of said throttle valve to thereby reduce said output torque of said engine.

15. A vehicle attitude control system according to claim 14, wherein said engine includes a main throttle valve disposed in said suction passage and operated mechanically or electrically according to an operation by the vehicle operator to accelerate the vehicle, and a secondary throttle valve which is electrically operated by said throttle actuator and which is disposed in series with said main throttle valve, said secondary throttle valve functioning as said throttle valve whose opening angle is reduced by said throttle actuator.

16. A vehicle attitude control system according to claim 15, wherein said deceleration control device decrements said angle of opening of said secondary throttle valve by a predetermined decrement amount, while a deceleration command generated from said controller is present.

17. A vehicle attitude control system according to claim 1, wherein said vehicle is a rear-drive 4-wheel vehicle having a front right and a front left wheel which are non-driving wheels, and a rear right and a rear left wheel which are driving wheels, and wherein said deceleration control device reduces an output torque of an engine of the vehicle to reduce rotating speeds of said rear right and left wheels for thereby decelerating the vehicle, said controller comprising first determining means fro determining, on the basis of the output of said vehicle condition sensor, whether the vehicle has a drift-out tendency or a spinning tendency, and second determining means for determining a deceleration time such that said deceleration time is longer when the vehicle has said drift-out tendency than when the vehicle has said spinning tendency, said vehicle continuously decelerated by said deceleration control device during said deceleration time.

18. A vehicle attitude control system according to claim 17, wherein said controller further comprises third determining means for determining whether said attitude control device is able to normally function to achieve said attitude control, and fourth determining means for determining said deceleration time such that said deceleration time is longer when said third determining means determines that said attitude control device is not able to normally function, than when said third determining means determines that said attitude control device is able to normally function.

19. A vehicle attitude control system according to claim 1, wherein said deceleration control device terminates said deceleration control when a predetermined condition of the vehicle for terminating said deceleration control is satisfied.

20. A vehicle attitude control system according to claim 19, wherein said predetermined condition of the vehicle for terminating said deceleration control is satisfied when said attitude control by said attitude control device is terminated.

\* \* \* \* \*

UNITED STATES PATENT AND TRADEMARK OFFICE
CERTIFICATE OF CORRECTION

PATENT NO. : 5,822,709
DATED : 13 October 1998
INVENTOR(S) : Kozo FUJITA

It is certified that error appears in the above-identified patent and that said Letters Patent is hereby corrected as shown below:

| Column | Line | |
|---|---|---|
| 1 | 28 | Change "coming" to --cornering--. |
| 5 | 36 | Before "above" delete "the". |
| 6 | 14 | Change "$a_2$" to --$a_1$--; change "$b_2$" to --$b_1$--. |
| 12 | 14 | Change "valve" to --valves--. |
| 12 | 15 | After "104" change "is" to --are--. |
| 12 | 17 | Change "valve" to --valves--. |
| 12 | 28 | Change "actuator" to --actuators--. |
| 13 | 13 | After "$\theta_s$" insert --.--. |
| 13 | 19 | Before "vehicle" insert --the--. |
| 14 | 24 | Change "V:vehicle speed" to --V: vehicle speed--. |
| 14 | 25 | Change "N:steering" to --N: steering--. |

UNITED STATES PATENT AND TRADEMARK OFFICE
CERTIFICATE OF CORRECTION

PATENT NO. : 5,822,709
DATED : 13 October 1998
INVENTOR(S) : Kozo FUJITA

It is certified that error appears in the above-identified patent and that said Letters Patent is hereby corrected as shown below:

| Column | Line | |
|---|---|---|
| 14 | 26 | Change "L:wheel" to --L: wheel--. |
| 14 | 27 | Change "A:stability" to --A: stability--. |
| 14 | 47 | Delete "ever". |
| 14 | 61 | Change "s14" to --S14--. |
| 15 | 60 | Change "17-S23" to --S17-S23--. |
| 16 | 11 | Change "IN" to --In--. |
| 16 | 30 | Change "actuator" to --actuators--. |
| 17 | 28 | Change "$\theta_M$" to --$\theta_M$.--. |
| 18 | 13 | After "embodiment" insert --,--. |
| 18 | 26 | After "reduced" insert --more--. |
| 18 | 53 | Change "s13-S24" to --S13-S24--. |

UNITED STATES PATENT AND TRADEMARK OFFICE
CERTIFICATE OF CORRECTION

PATENT NO. : 5,822,709
DATED : 13 October 1998
INVENTOR(S) : Kozo FUJITA

It is certified that error appears in the above-identified patent and that said Letters Patent is hereby corrected as shown below:

| Column | Line | |
|--------|------|---|
| 19 | 5  | Change "include" to --includes--. |
| 19 | 12 | Change "so" to --to--. |
| 19 | 17 | Change "inhibit" to --inhibits--. |
| 20 | 32 | Change "IN" to --In--. |
| 20 | 52 | Change "sill" to --will--. |
| 21 | 16 | Change "include" to --includes--. |
| 21 | 17 | Change "portions" to --portion.--. |
| 24 | 9  | Change "means fro" to --means for--. |
| 24 | 15 | After "vehicle" insert --being--. |

Signed and Sealed this

Twelfth Day of December, 2000

Attest:

Q. TODD DICKINSON

*Attesting Officer*              *Director of Patents and Trademarks*